United States Patent [19]

Komurasaki

[11] Patent Number: 4,869,095

[45] Date of Patent: Sep. 26, 1989

[54] VIBRATION DETECTING DEVICE

[75] Inventor: Satoshi Komurasaki, Himeji, Japan

[73] Assignee: Mitsubishi Denki Kabushiki Kaisha, Tokyo, Japan

[21] Appl. No.: 249,738

[22] Filed: Sep. 26, 1988

[30] Foreign Application Priority Data

Oct. 1, 1987 [JP] Japan .................................. 62-150591

[51] Int. Cl.⁴ ............................................. G01L 23/22
[52] U.S. Cl. ........................................ 73/35; 310/329
[58] Field of Search .............. 73/DIG. 1, DIG. 4, 35, 73/652, 654; 310/329, 338

[56] References Cited

U.S. PATENT DOCUMENTS

| | | | |
|---|---|---|---|
| 4,373,378 | 2/1983 | Fujishiro et al. | 73/35 |
| 4,374,472 | 2/1983 | Nishimura | 73/35 |
| 4,483,181 | 11/1984 | Maekawa et al. | 73/35 |
| 4,524,625 | 6/1985 | Takeuchi | 73/35 |
| 4,660,409 | 4/1987 | Miyata et al. | 73/35 |
| 4,742,262 | 5/1988 | Ferry | 73/35 |

Primary Examiner—John Chapman
Assistant Examiner—Michele Simons
Attorney, Agent, or Firm—Sughrue, Mion, Zinn, Macpeak & Seas

[57] ABSTRACT

A vibration detecting device especially intended for detecting the knocking of an internal combustion engine. Various components inclusive of a piezoelectric element are mounted around a cylindrical portion of a bush with an insulating tube disposed therebetween. An insulating tube fills the space between the cylindrical portion and the components that are arranged to be aligned with the cylindrical portion. The outermost part of the tube serves as a reference surface in arranging the components to be mounted in alignment with the cylindrical portion during assembly, thereby allowing them to be mounted precisely in alignment with the cylindrical portion.

5 Claims, 2 Drawing Sheets

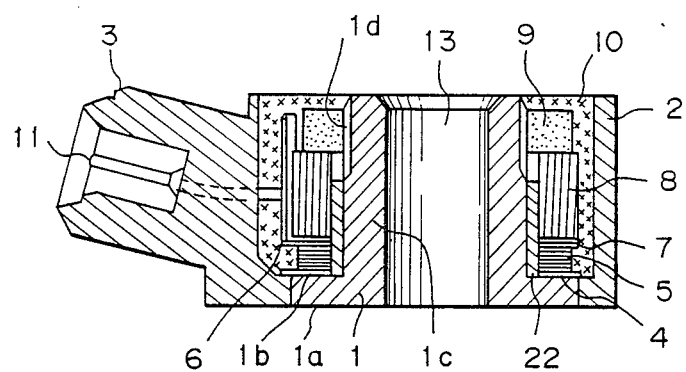
Fig. 1
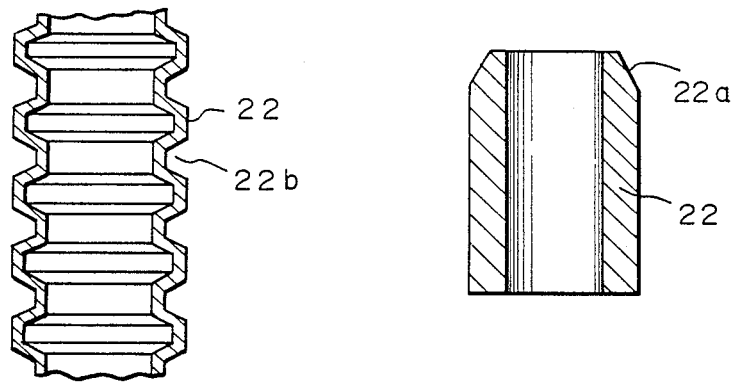
Fig. 2(b)
Fig. 2(a)
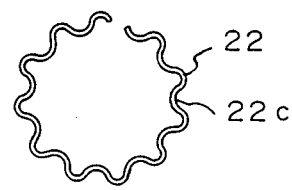
Fig. 2(c)

VIBRATION DETECTING DEVICE

FIELD OF THE INVENTION

This invention relates to a vibration detecting device for detecting the occurrence of knocking from the vibration of an internal combustion engine.

DESCRIPTION OF THE PRIOR ART

In FIGS. 3(a) and 3(b) respectively showing a plane view of the above mentioned vibration detecting device of the conventional type, and a cross-sectional view taken along the line III—III of FIG. 3(a), a numeral 1 denotes a ferrous metal made bush having a bolt receiving hole 13 at the center of the device. The bush 1 also has a lower surface 1a adapted to rest on an internal combustion engine, a base surface 1b on which components are mounted, and a cylindrical portion 1c around which the components are arranged. A numeral 2 denotes a case secured to the outer periphery of the bush 1 which cooperates with the same to define a space for receiving the components, numeral 3 denotes a connector integral with the case 1 with a pin 11 therein which emits an electrical signal, numeral 4 denotes a plate sitting on the base surface 1b, numeral 5 denotes a piezoelectric element for converting vibrations into electrical signals with the reference electrode thereof connected to the plate 4, numeral 6 denotes a terminal connected to the output electrode of the piezoelectric element 5 for outputting the electrical signal therefrom, numeral 7 denotes an insulating sheet which is in the form of a film consisting of, for example, polyethylene terephthalate (PET) or polyphenylene sulfite (PPS) and which is arranged to be in contact with the terminal 6 at the surface in the back of the other which is in contact with the element 5, numeral 8 denotes a weight designed to impose an inertial force on the piezoelectric element 5 in response to any vibration, numeral 9 denotes a nut screwed onto the threaded portion 1d of the cylindrical portion 1c to secure the components, i.e., the plate 4, the piezoelectric element 5, the terminal 6, the insulating sheet 7 and the weight 8 to the cylindrical portion 1c of the bush 1, numerical 10 denotes a filling consisting of an epoxy resin which is plugged into the space between the bush 1 and the case 2, and numeral 12 denotes an insulating tube of an adhesive tape or a heat-shrinkable tube located between bush 1 and other elements to be insulated from the bush 1, i.e., the piezoelectric element 5 and the terminal 6. As the terminal 6 is connected to the pin 11, the electrical signal is output via the connector 3.

The principle whereby vibrations are detected will now be described. The bush 1 is secured by the provision of a bolt (not shown) inserted through the hole 13 with the lower surface 1a in contact with an internal combustion engine. The vibrations generated by an engine in response to the driving conditions thereof are transmitted to the device via the lower surface 1a. The vibrations transmitted cause the weight 8 to impose an inertial force on the piezoelectric element 5 which is mounted substantially in abutment with the weight 8. When the inertial force is applied to the element 5, an electrical signal proportional in voltage to the magnitude of the force on the basis of the reference electrode adjacent to the plate 4 appears on the electrode connected to the terminal 6. The bush 1 shares the same voltage with the reference electrode of the element 5 through the metal made plate 4 and both of the metal made nut 9 and weight 8, which are in contact with the bush 1 in turn, also have a common voltage. This requires the insulating sheet 7 to keep the terminal 6 electrically away from the weight 8 so that the signal from the element 5 will be supplied to the terminal 6 and output via the pin 11. With the insulating tube 12 provided for the cylindrical portion 1c of the bush 1, the cylindrical portion 1c would be kept electrically out of contact with the terminal 6 even if erroneously mounted out of its proper position. It should be noted that the insulating tube 12 has the important role of allowing the signal to be correctly emitted.

No filling 10 is used in the space around the cylindrical portion 1c provided with the insulating tube 12 and the inside surrounded by the base surface 1b, the plate 4, element 5, the terminal 6, the insulating sheet 7, the weight 8 and the nut 9.

The above described device of the conventional type has the problem that it is apt to cause misalignment of the components to be mounted with the cylindrical portion 1c due to the existence of the thin isolating tube 12 and this misalignment may be enough to make a space between the components and the same electrically isolating the components. such as piezoelectric element 5, from the cylindrical portion 1c of the bush 1.

SUMMARY OF THE INVENTION

It is an object of this invention to provide a vibration detecting device being adapted to be free from any danger of causing misalignment of the components to be mounted, such as piezoelectric element, with respect to a cylindrical portion of a bush.

The device according to this invention has an insulating tube designed to suitably fit in the space between the cylindrical portion and components arranged to be aligned with the cylindrical portion.

The components should be mounted to the cylindrical portion as close as possible to the insulating tube which has been provided for the cylindrical portion as possible on assembly. The outer surface of the insulating tube can serve as a means of reference in locating the components so as to be precisely aligned with the cylindrical portion. Devices assembled in the manner described above enjoy high reliability.

In one embodiment of this invention, the insulating tube has substantially the same thickness as the width of the gap between the cylindrical portion and the components arranged to be aligned therewith. The tube may have a tapered surface at the upper end thereof.

In another embodiment of this invention, the tube consists of a film designed for radial elastic deformation. The tube may have a plurality of annular grooves axially arranged to fit in the space between the cylindrical portion and the components. The tube may also have a plurality of axially directed linear grooves arranged along the periphery to fit in the space between the cylindrical portion and the components.

BRIEF DESCRIPTION OF THE DRAWINGS

The present invention will be described hereinunder in detail by way of preferred embodiments and with reference to the accompanying drawings, wherein:

FIG. 1 shows a cross-sectional view of a vibration detecting device according to the first embodiment of this invention;

FIGS. 2(a)–2(c) respectively show cross-sectional views of the insulating tubes of other embodiments;

Figure 3A:
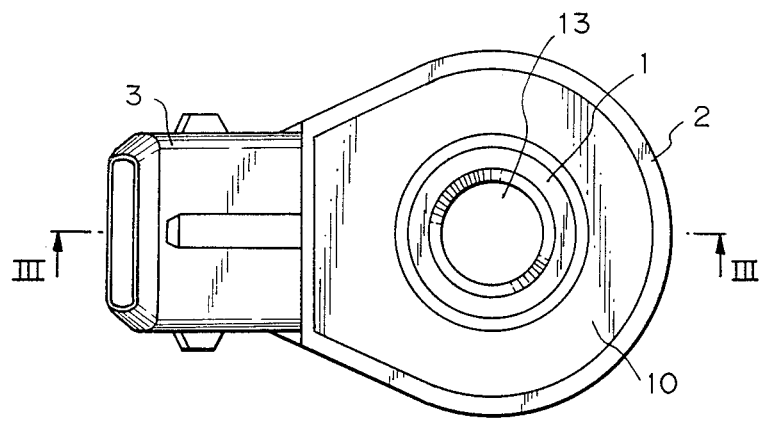
FIGS. 3(a) and 3(b) respectively show a plane view of a vibration detecting device of the conventional type, and a cross-sectional view taken along the line III—III of FIG. 3(a).
Figure 3B:
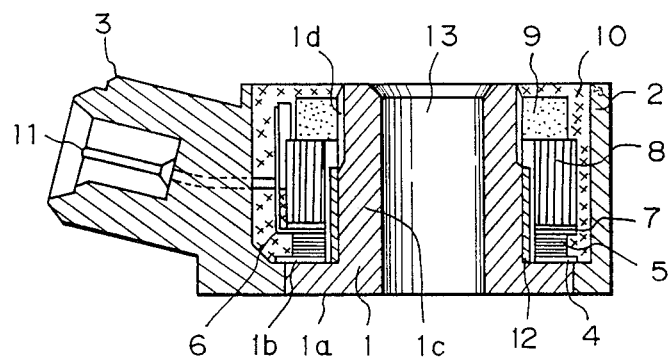

PREFERRED EMBODIMENTS OF THE INVENTION:

FIG. 1 shows a first embodiment of this invention. In FIG. 1, parts 1-11 and 13 are indentical to those of the device of the conventional type illustrated in FIG. 3. The vibration detecting device of this invention has an insulating tube 22 in place of the tube 12 of the conventional type. The insulating tube 22 is designed to have the same thickness as the gap between the outermost part of the cylindrical portion 1c of the bush 1 and the innermost part of the components, including the piezoelectric element 5, which are arranged to be aligned with the cylindrical portion. The insulating tube 22 is preferably made of, for example, polypropylene (PP), polyethylene terephthalate (PET) or polyphenylene sulfite (PPS).

The components are mounted to the cylindrical portion with the insulating tube 22 in place and are brought into as close a contact as possible with the outermost part of the tube 22. The outermost part of the tube 22 acts as a means of reference in arranging the components in alignment with the cylindrical portion 1c on assembly. Thus misalignment of the components with the cylindrical portion 1c can be avoided.

Each drawing in FIG. 2 shows different embodiments of the insulating tube 22 of this invention.

FIG. 2(a) shows a second embodiment of the tube 22 of this invention which has a tapered surface 22a at the upper portion thereof. Such a tapered surface acts to facilitate mounting of the components around the tube 22.

As shown in FIG. 2(b), the insulating tube 22 of a third embodiment is substantially in the form of a bellows formed of a sheet material like a film. This tube 22 has a plurality of annular grooves 22b axially arranged at equal distances to fit in the space between the cylindrical portion 1c and the components. The tube 22 of FIG. 2(b) serves to decrease the overall weight. The tube 22 can also provide a relatively close contact with the components that are press-fitted thereon by virtue of the radial elastic deformation that takes place in the tube 22.

In FIG. 2(c), the insulating tube 22 of a fourth embodiment is also formed of a film and has a plurality of axially directed linear grooves 22c arranged along the periphery at equal distances which allow it to fit in the space between the cylindrical portion 1c and the components. This tube 22 provides the same effects as the third embodiment.

What is claimed is:

1. A vibration detecting device comprising:
   a bush including a cylindrical portion, a center hole for a bolt being formed through said cylindrical portion to allow said bush to be fixed to an internal combustion engine;
   a case surrounding said cylindrical portion of said bush to define a space therebetween for receiving components inclusive of a piezoelectric element; and
   an insulating tube for electrically isolating said components from said cylindrical portion, an inner surface of said insulating tube being disposed adjacent an outer surface of said cylindrical portion, and an outer surface of said insulating tube contacting inner cylindrical surfaces of said components,
   said insulating tube substantially filling a gap between said cylindrical portion and said components, said components being coaxially aligned with and disposed around said cylindrical portion.

2. A vibration detecting device in accordance with claim 1, wherein said tube has a tapered surface at the upper end thereof.

3. A vibration detecting device in accordance with claim 1, wherein said tube is radially elastically deformable.

4. A vibration detecting device in accordance with claim 3, wherein said tube comprises a film having a plurality of annular grooves axially arranged to fit in said gap between said cylindrical portion and said components.

5. A vibration detecting device in accordance with claim 1, wherein said tube comprises a film having a plurality of axially directed linear grooves arranged along the periphery to fit in said gap between said cylindrical portion and said components.

* * * * *